(12) United States Patent
Wei et al.

(10) Patent No.: US 11,467,127 B2
(45) Date of Patent: Oct. 11, 2022

(54) VISUAL ULTRASONIC NONDESTRUCTIVE TESTING DEVICE AND METHOD FOR DEEP/LONG-HOLE PIPE

(71) Applicant: Army Academy of Armored Forces of PLA, Beijing (CN)

(72) Inventors: Shicheng Wei, Beijing (CN); Yi Liang, Beijing (CN); Yujiang Wang, Beijing (CN); Ye Zhu, Beijing (CN); Lei Guo, Beijing (CN); Bo Wang, Beijing (CN)

(73) Assignee: Army Academy of Armored Forces of PLA, Beijing (CN)

( * ) Notice: Subject to any disclaimer, the term of this patent is extended or adjusted under 35 U.S.C. 154(b) by 218 days.

(21) Appl. No.: 16/739,848

(22) Filed: Jan. 10, 2020

(65) Prior Publication Data

US 2020/0225192 A1 Jul. 16, 2020

(30) Foreign Application Priority Data

Jan. 16, 2019 (CN) .......................... 201910039823.8

(51) Int. Cl.
*G01N 29/06* (2006.01)
*G01N 29/22* (2006.01)
*G01N 29/24* (2006.01)
*G01N 29/28* (2006.01)

(52) U.S. Cl.
CPC ....... *G01N 29/0654* (2013.01); *G01N 29/225* (2013.01); *G01N 29/24* (2013.01); *G01N 29/28* (2013.01); *G01N 2291/0232* (2013.01); *G01N 2291/0234* (2013.01); *G01N 2291/0289* (2013.01); *G01N 2291/102* (2013.01); *G01N 2291/2634* (2013.01)

(58) Field of Classification Search
CPC .......... G01N 29/024; G01N 2291/011; G01N 2291/022; G01N 2291/02836; G01N 2291/02881; G01N 2291/102; G01K 11/24; G01F 23/2961; H04M 1/72454
See application file for complete search history.

(56) References Cited

U.S. PATENT DOCUMENTS

| 4,170,145 A | * | 10/1979 | Kennedy | .............. | G01N 29/265 |
| | | | | | 73/618 |
| 4,383,448 A | * | 5/1983 | Fujimoto | ............. | G01N 29/265 |
| | | | | | 376/252 |
| 5,028,381 A | * | 7/1991 | Dugue | ................... | B23K 31/12 |
| | | | | | 376/252 |

* cited by examiner

*Primary Examiner* — Tarun Sinha
(74) *Attorney, Agent, or Firm* — Knobbe Martens Olson & Bear LLP (57) ABSTRACT

The present invention discloses a visual ultrasonic nondestructive testing device and method for a deep/long-hole pipe. The device is composed of an ultrasonic measurement module, a mechanical motion module, a control module, and a coupling injection and assistance module. The ultrasonic measurement module includes an ultrasonic pulse transmitter/receiver, and the ultrasonic transmitter/receiver includes a high-speed analog/digital (A/D) converter; the mechanical motion module includes a scanning device, a probe and a holding device thereof, and a magnetic drive device. A scanning device can move in two directions, that is, an X-axis on which a magnetic driving wheel steps and a Y-axis on which a module body tests. During the scanning process, on the X-axis, a stepping motor drives a synchronous wheel-belt transmission, so that the magnetic driving wheel is rotated to achieve the purpose of stepping; on the Y-axis, a stepping motor on the module body drives the probe to reciprocate.

3 Claims, 6 Drawing Sheets

| Item No. | Part No. | Description | Quantity |
|---|---|---|---|
| 1 | Probe | | 1 |
| 2 | Adjustment fixture | | 2 |
| 3 | Coupling device | | 1 |
| 4 | Compression fixture | | 1 |
| 5 | Connection and fixing plate | | 1 |
| 6 | water pump | | 1 |
| 7 | water supply pipeline | | 1 |

VISUAL ULTRASONIC NONDESTRUCTIVE TESTING DEVICE AND METHOD FOR DEEP/LONG-HOLE PIPE

CROSS-REFERENCE TO RELATED APPLICATION

This application claims priority to Chinese Patent Application No. 201910039823.8, filed Jan. 16, 2019, the entire contents of which are hereby incorporated by reference in their entirety.

TECHNICAL FIELD

The present invention belongs to the field of corrosion monitoring and testing of equipment materials, and relates to a visual ultrasonic nondestructive testing device and method for a deep/long-hole pipe.

BACKGROUND

Deep/long-hole pipes used for equipment play an important role in their application fields, but they often have many potential safety hazards during service. A large amount of pipes are widely used in oil and gas industry, and but also have a high scrap rate. China produces about 700,000 tons of waste oil pipes and sucker rods each year, which not only occupy the site, but also cause a huge waste of resources. In addition, there are also potential safety hazards caused by pipeline corrosion. In domestic and foreign news reports, oil and gas leakage accidents caused by pipeline corrosion often occur. The common cause of these accidents is that hidden dangers of pipeline corrosion failures are not monitored or tested adequately, especially that major hidden dangers existing in oil pipelines are not investigated or treated scientifically and effectively. The online quality inspection and identification during the production process of pipe products and the regular maintenance and repair of in-service pipelines both are the key tasks to prevent accidents. The remanufacturing and nondestructive testing of waste oil pipes can solve the problems of oil pipe accumulation, corrosion and scaling. In this way, the service life of oil pipes is extended by more than 3 times, the service safety is ensured, and the economic and social benefits are significant. In addition, the use of appropriate nondestructive testing methods to ensure the quality of remanufactured military supplies of strategic reserve oil depots, supply pipelines and the like has become an urgent issue to eliminate hidden safety hazards and ensure the safe service of equipment. It will bring about significant military and environmental benefits. However, remanufactured deep/long-hole pipes are usually small in the pipe space, which makes it difficult to accommodate testing equipment. Meanwhile, during the remanufacturing process, heterogeneous porous anticorrosive and wear-resistant coatings are introduced, and a material interface is generated. Therefore, the testing of inner wall defects of deep/long-hole pipes has become a prominent problem that is difficult to overcome during industry production and actual service.

SUMMARY

An objective of the present invention is to develop nondestructive, efficient and accurate testing equipment for a deep/long-hole pipe, to carry out qualitative and quantitative testing and evaluation for the deep/long-hole pipe. The present invention fills in the gap of the existing technology, and has the advantages of clearness, intuitiveness, and accuracy, etc. The present invention provides a theoretical basis and technical support for improving the efficiency and accuracy of pipe testing, and realizing the industrialization, informatization, intelligent production, and online, in-service testing of equipment remanufacturing.

In order to achieve the above objective, the present invention adopts the following technical solution: a visual ultrasonic nondestructive testing device and method for a deep/long-hole pipe. The device is composed of an ultrasonic measurement module, a mechanical motion module, a control module, and a coupling injection and assistance module. The present invention can carry out automatic ultrasonic online and in-service testing of the deep/long-hole pipe, qualitative and quantitative testing of an inner wall defect, and imaging and quality evaluation. In addition, the present invention has reasonable scanning speed and ultrasonic beam coverage, and high testing efficiency.

1. A visual ultrasonic nondestructive testing device for a deep/long-hole pipe, where the device is composed of an ultrasonic measurement module, a mechanical motion module, a control module, and a coupling injection and assistance module.

The ultrasonic measurement module includes an ultrasonic pulse transmitter/receiver, and the ultrasonic transmitter/receiver includes a high-speed analog/digital (A/D) converter.

The mechanical motion module includes a scanning device, a probe and a holding device thereof, and a magnetic drive device.

The connection between the various parts of the device is: the scanning device is fixedly connected to the magnetic drive device, and the probe and the holding device thereof are tightly connected to the scanning device. The probe holding device ensures that the probe always contacts an outer wall of a pipe in a normal direction to maintain an ultrasonic beam vertical to a normal plane of the pipe.

The scanning device includes: a scanning module body and a stepping motor. The stepping motor is fixed to the module body by a bolt, and is connected to a synchronous wheel axle inside the module body through a coupling.

The scanning device can move in two directions, that is, an X-axis on which a magnetic driving wheel steps and a Y-axis on which the module body tests. During the scanning process, on the X-axis, a stepping motor drives a synchronous wheel-belt transmission, so that the magnetic driving wheel is rotated to achieve the purpose of stepping. On the Y-axis, the stepping motor on the module body drives the probe to reciprocate. Each time when the probe moves on the Y-axis, the X-axis is intersected to step once, thereby generating a grid scan image.

A non-contact water spray coupling method is used for coupling. A water pump and a direct current power supply are used as assistant devices. The water pump provides a coupling environment for coupling the probe with water. The direct current power supply provides the device with power. Water is used as a couplant. The water pump is installed for water supply, and a water supply pipeline supplies water to the position of the probe to ensure intact contact of the probe with the surface of a workpiece.

2. A method using the device, including:

1) lifting the scanning device, attaching the scanning device to the workpiece to be tested; first opening a computer in the control module; turning on a switch of the scanning device;

2) adjusting scanning parameters such as a scanning range, a delay, and a gain to display an A-scan waveform on an interface; adjusting a scanning parameter in the X and Y directions, turning on a water supply switch, and starting scanning after a bubble is discharged;

3) after scanning somewhere, stopping scanning, and changing the position to continue scanning, where the scanning can be paused at any time during the scanning process;

4) setting the scanning speed and range through motor control, where the X axis is a direction on which the magnetic wheel steps, and the Y axis is a direction on which a scan axis steps;

5) controlling the position of the probe to pinpoint the position of a defect and set a starting position, where a stop function may stop a motion or scanning process immediately;

6) displaying the A-scan waveform within the range during scanning, where the height of the A-scan waveform is enlarged by adjusting the gain value; the A-scan waveform in a target area is displayed in an A-scan interface by a delay function;

7) amplitude imaging, generated by the height of a reflected amplitude received; or distance imaging;

8) displaying a defect area, and calculating the percentage of a total defect area to determine whether the workpiece is qualified;

9) turning off the water supply switch, the scanning device switch and the computer in order after the scan is completed; and 10) choosing whether to save data or an image; where, the data saved at the beginning of the test can be played back through an image loading function, and the playback process can be paused and ended at any time.

By adopting the above technical method, the present invention has the following advantages.

1. Wide application range, strong test capability and high degree of automation. The present invention has wide scanning range. The present invention can carry out circumferential scanning on the pipeline, and adapts to multiple pipe diameters from 73 mm to 300 mm, with the smallest outer pipe diameter being as low as 73 mm. The present invention not only completes the task of testing the pipe before and after remanufacturing, but also expands the application field of the visual nondestructive testing device. In addition testing a specific pipe, the present invention can further test a workpiece of large pipe facilities and smooth precision welds in the application of petrochemical industry, shipbuilding, pipeline welding, and nuclear energy testing, etc., including fast C-scan imaging test of defects, such as corrosion thinning, porosity, looseness, through-wall cracks, and poor bonding of remanufacturing coatings in petroleum, natural gas, municipal water supply pipes/clad pipes, tanks, ships, and plates.

2. The present invention can realize the effective testing of deep/long-holes from the outside. The present invention is simple and convenient, and does not need to set up a built-in probe, which avoids the limitation of the size of the probe by a small pipe diameter. The present invention adopts a variety of waterproof designs, which prevent the splash of water from affecting the operation of the equipment. The device is small-sized, portable, maneuverable, and close to the workpiece. The present invention only needs to reserve an 85 mm radial crawl space, which is conducive to normal operation in a limited space. The present invention follows a modular design principle, and can add more assistant modular devices according to the needs of use. Therefore, the present invention is compatible, facilitating subsequent improvement and upgrade of the testing device.

3. By adding the magnetic driving wheel, the testing device has strong magnetic adsorption, ensuring that the testing device can perform testing operations along vertical, horizontal, and inverted surfaces. The testing device is easy to control, and tests remotely. By using software to automatically control a magnetic motion device, the present invention reduces manual operation errors. The present invention overcomes the problem that the pipeline needs to be shut down to diagnose a fault in the past, and realizes in-service testing, thereby reducing the impact of inspection and maintenance on production and ensuring the production progress. The testing effect is less affected by the working environment and the testing results are stable and reliable.

DETAILED DESCRIPTION

The present invention comprehensively considers the above background and current situation, and aims to solve the problems that deep/long-hole pipes for equipment are prone to corrosion failure during service, and the remanufacturing process is lacking in effective online monitoring methods and equipment. Therefore, the present invention adopts ultrasonic testing technology to develop a special monitoring and testing instrument for deep/long-hole pipes for equipment. The present invention overcomes the problems of heterogeneous coatings, high noise, large sound attenuation, and interference of pores and interfaces on imaging during remanufacturing, etc. The present invention can provide a theoretical basis and technical support for the quality control of remanufacturing of equipment pipes.

(1) An ultrasonic measurement module is the core of the entire device and mainly performs three steps of data acquisition, image processing, and quantitative analysis. Data acquisition is completed by an ultrasonic transmitter/receiver and a stepping/servo motor together. An ultrasonic pulse transmitter/receiver is used, which includes a high-speed analog/digital (A/D) converter. A single-crystal immersion probe is used to obtain ultrasonic data. A motion controller sends a pulse signal to achieve a precise motion of the stepping/servo motor. An actual stepping distance for each set of pulses is 0.5-2 mm, which is usually set to 1 or 1.5, so as to realize the feedback of position information. A-scan is combined with position information to generate an ultrasonic C-scan image. After an industrial computer acquires the ultrasonic data, the impact of the transmission and conversion devices and the surrounding environment will cause the quality of the ultrasonic image to be reduced after reconstruction. The ultrasonic data is denoised to improve the image quality, ensuring the stability of defect characteristic extraction, and improving testing accuracy. During the ultrasonic testing of a material, the echo characteristics of various types of defects are significantly different. Therefore, an image obtained by reconstructing an ultrasonic echo signal should include a lot of information reflecting a physical characteristic of the defect, including the size, depth, shape and distribution of the defect. Threshold function image segmentation technology can be used to realize margin threshold extraction of the defect. The defect is visualized while the remaining thickness of a pipe wall is measured. The testing result is evaluated, so as to further qualitatively and quantitatively characterize the defect, and further determine whether a pipe is qualified. The present invention is different from a one-time measurement method of general ultrasonic testing equipment. The present invention generates two C-scan images respectively at the bottom of a wave of a metal layer, that is, the bottom of a wave at a metal-ceramic joint, and at the bottom of a wave of a ceramic layer. The two images are superimposed, so that the defects at the joint of the pipe wall and at the ceramic layer are displayed on one C-scan image at the same time. This prevents the defect at the joint from causing the ceramic layer to be missed, and is suitable for testing a double-layer clad pipe.

Figure 1:
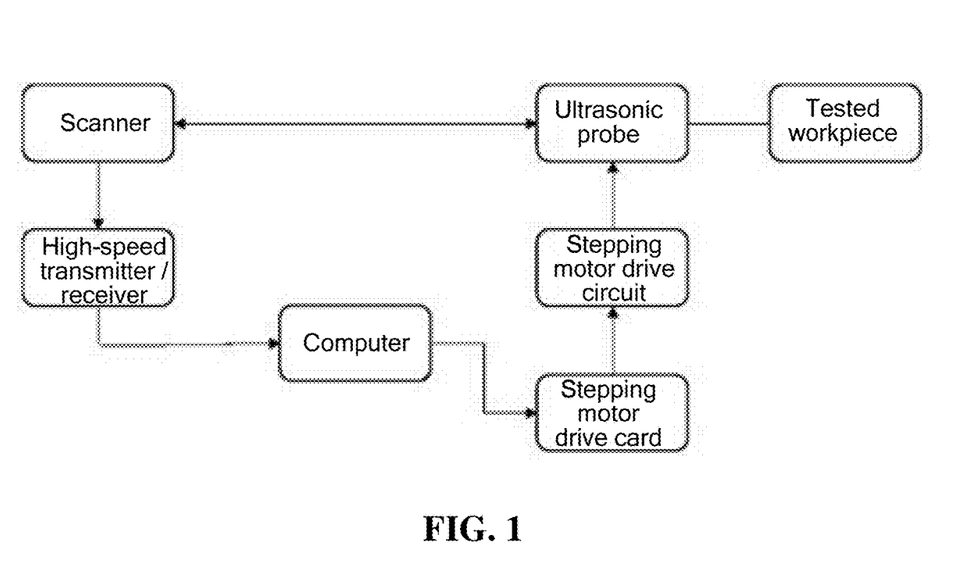
FIG. 1 shows a scanner system device structure in accordance with an embodiment of the invention.
Figure 2:
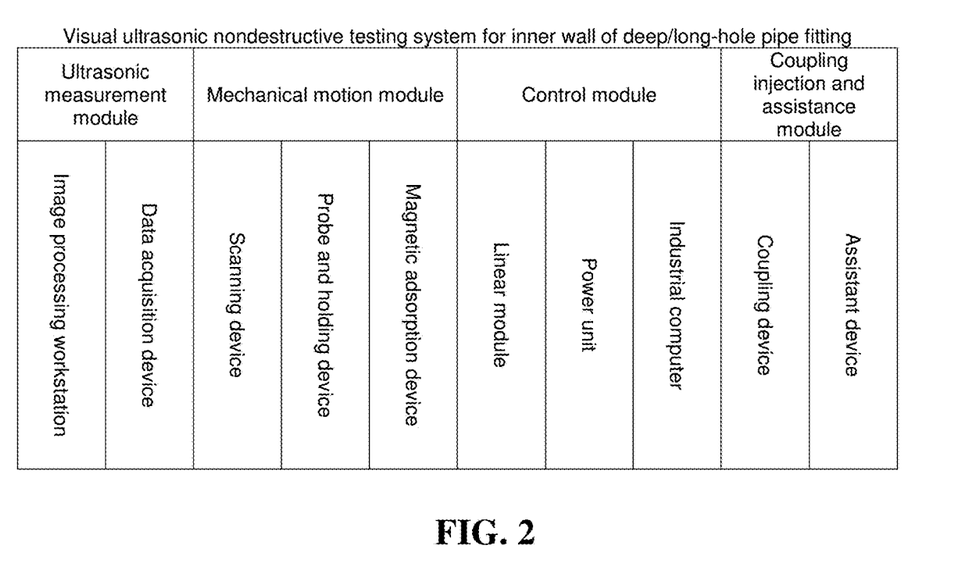
FIG. 2 shows modules and components of the device of FIG. 1 in accordance with an embodiment of the invention.
Figure 3:
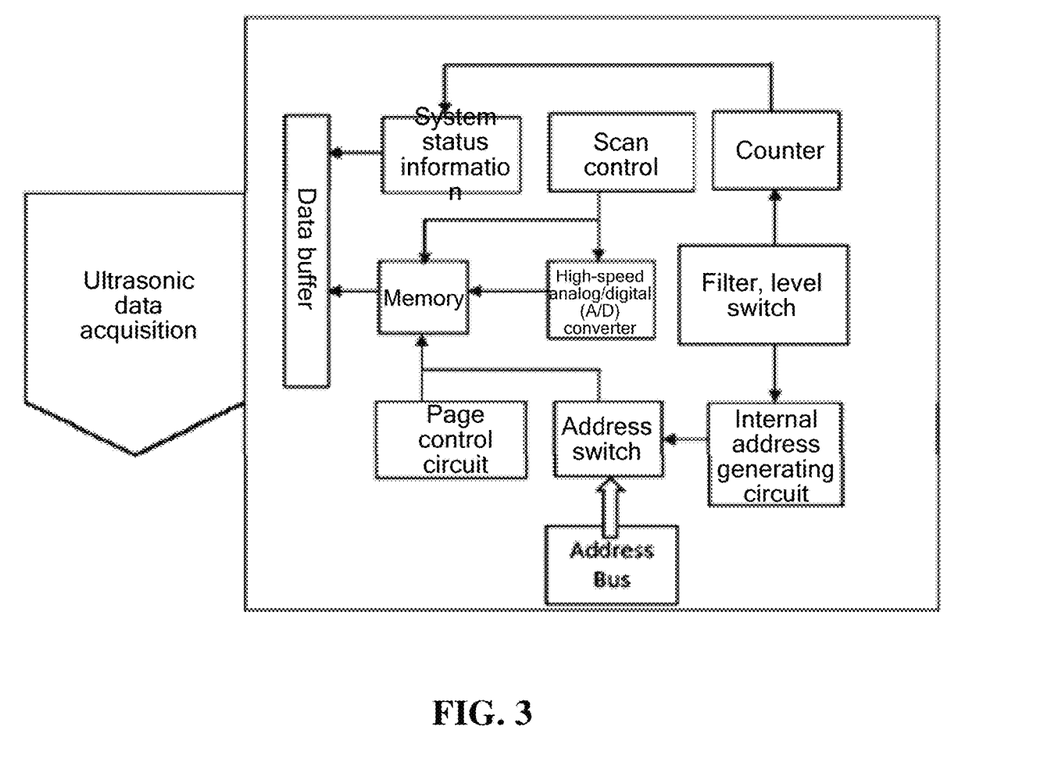
FIG. 3 shows ultrasonic data acquisition in accordance with an embodiment of the invention.
Figure 4:
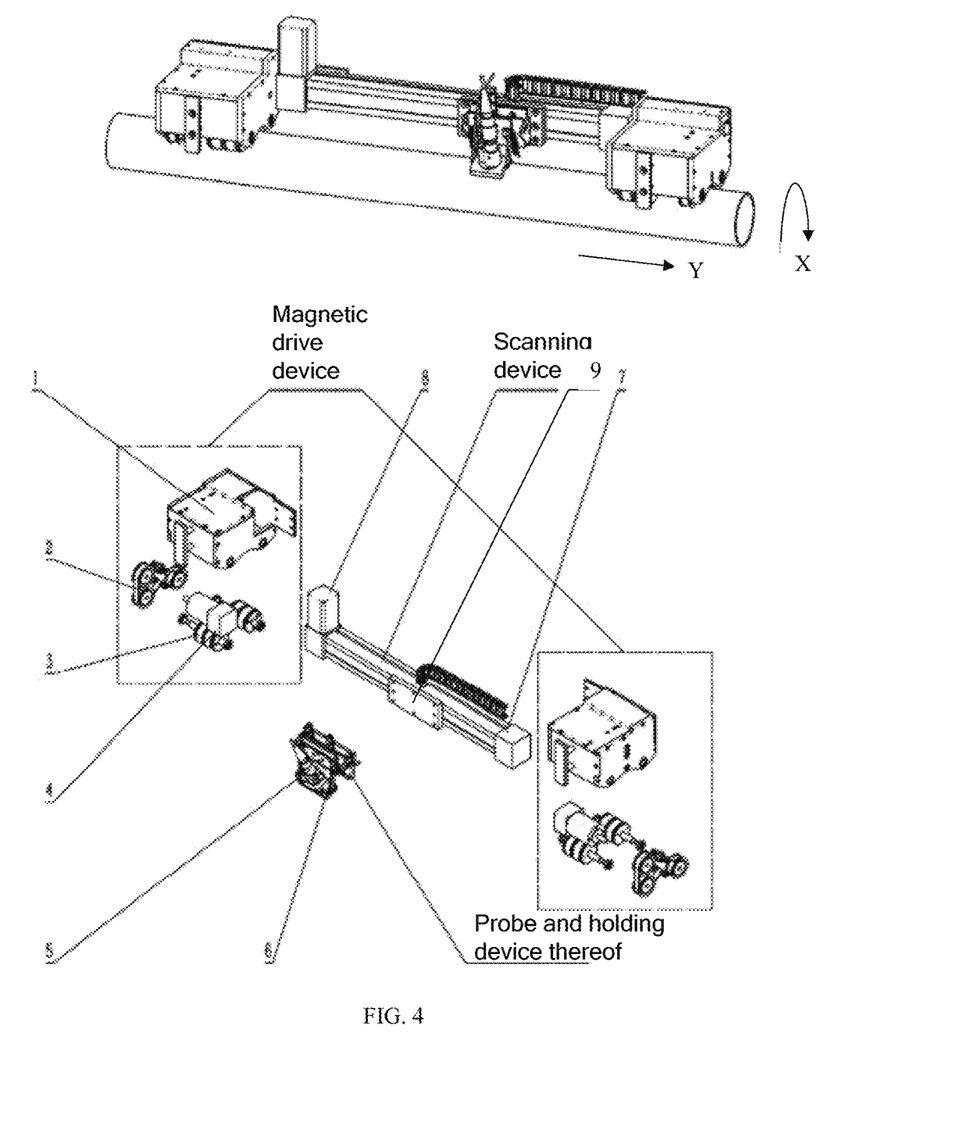
FIG. 4 shows an ultrasonic pulse transmitter/receiver in accordance with an embodiment of the invention.
Figure 5:
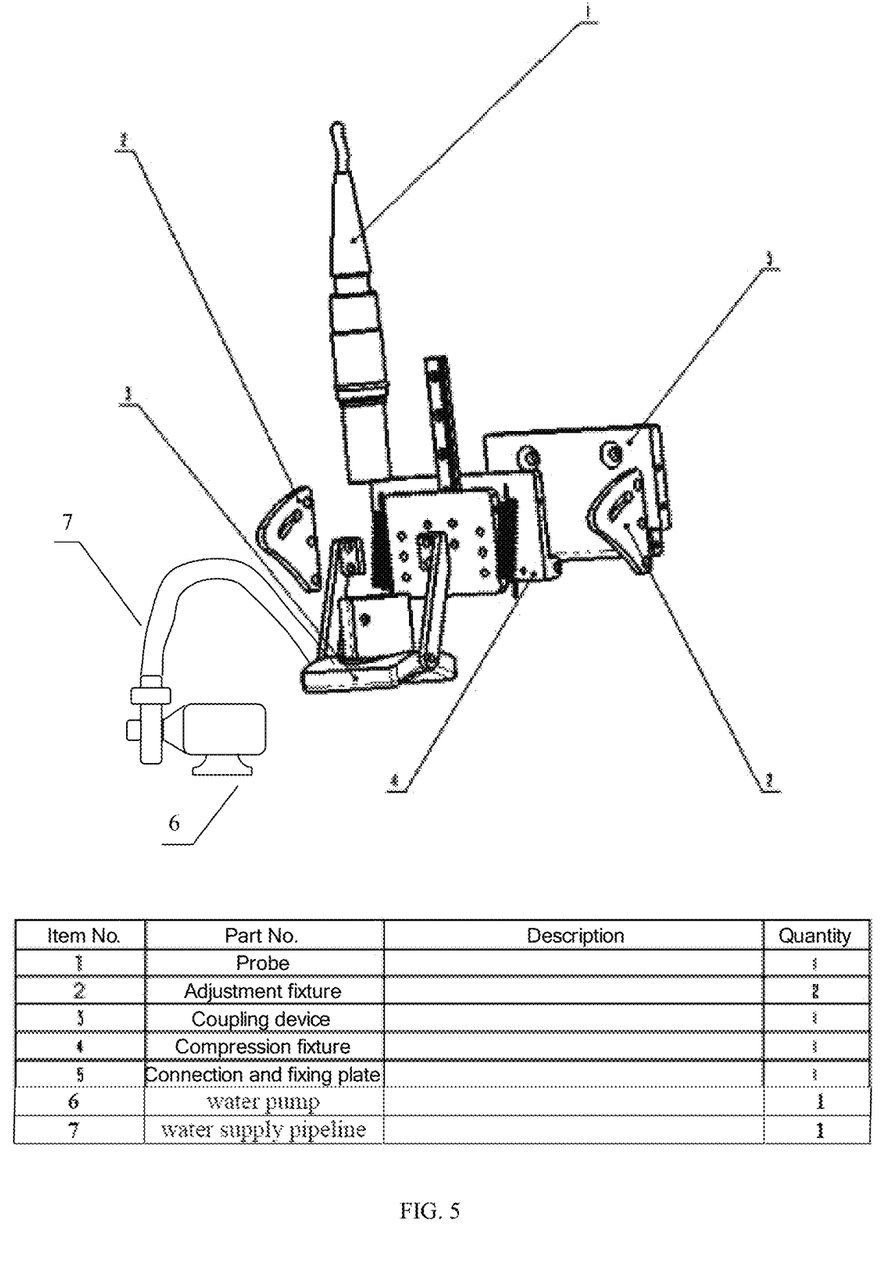
FIG. 5 shows an overall design of scanning device in accordance with an embodiment of the invention.

The mechanical motion module includes a scanning device, a probe and a holding device thereof, and a magnetic drive device. The sampling frequency is 5 MHz, and the highest scanning speed can be set to 220 mm/s, usually 150 mm/s. As shown in FIG. 4, the connection between the various parts of the device is as follows: a module body 7 of the scanning device and a housing 1 of a magnetic adsorption power unit are fixedly connected by eight M4 hexagon socket head bolts; the probe and the holding device thereof are tightly connected to a slider on the module body 7 of the scanning device by four M6 countersunk bolts. The entire instrument is connected to a control device through two connecting wires output from a rear connector of the housing 1 of the magnetic adsorption power unit.

The magnetic drive device includes two sets of housings 1, two sets of synchronous transmission wheels-belts 2, three sets of magnetic driving wheels 3, and four sets of stepping motors 4 equipped with a 40:1 reducer. Each set of synchronous transmission wheel-belt 2 includes three synchronous wheels and one synchronous belt. The synchronous wheels are respectively arranged on an output shaft of the reducer and a spindle of the magnetic driving wheel 3 through a 3 mm flat key and a group of 90° distributed tacks, and are driven by the synchronous belt. After the spindle of the magnetic driving wheel 3 is added with a bearing at a bearing position, the spindle is placed in a bearing hole of the housing 1 to limit the motion freedom thereof. The stepping motor 4 is fixed to the housing 1 by four M4 countersunk bolts.

Figure 6:
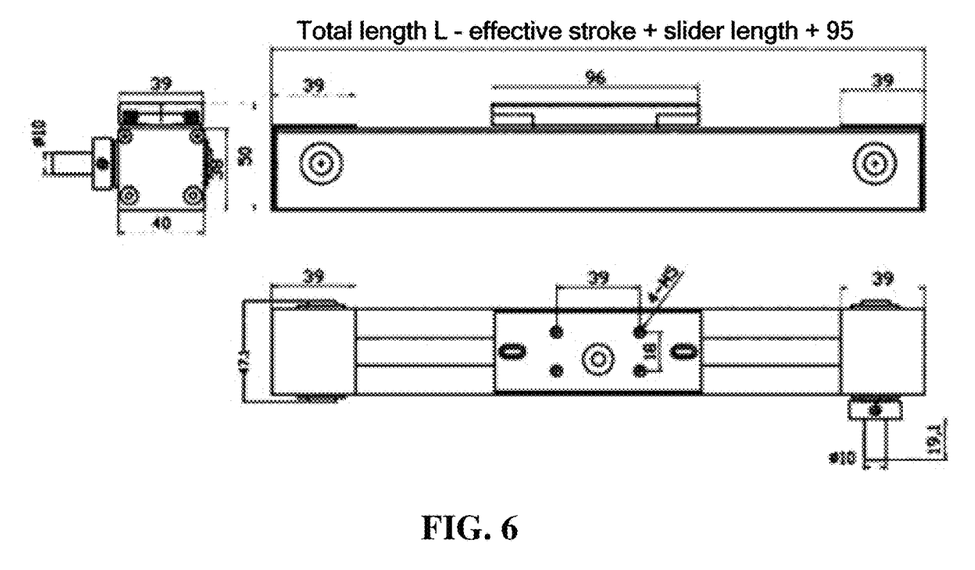
FIG. 6 shows a design of probe and probe holding device in accordance with an embodiment of the invention.

The probe and the holding device thereof include a 5 MHz flat probe 5 of OLYMPUS and a set of probe adjustment and fixing bracket 6. The probe 5 is placed in a round hole on the probe adjustment and fixing bracket 6, and a bolt beside is tightened to clamp and fix the probe.

Figure 7:
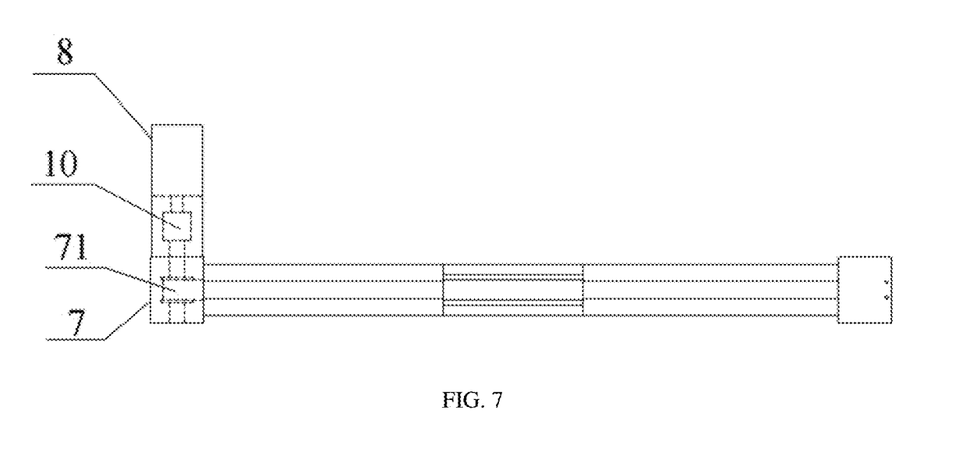
FIG. 7 shows a schematic view of a scanning module body and a stepping motor in accordance with an embodiment of the invention, wherein the coupling and the wheel axle are schematically shown.

The scanning device includes: a scanning module body 7 and a stepping motor 8. The stepping motor 8 is fixed to the module body 7 through four M3 bolts, and is connected to a synchronous wheel axle 71 inside the module body 7 through a coupling 10.

The scanning device can move in two directions, that is, an X-axis on which the magnetic driving wheel steps and a Y-axis on which the module body tests. During the scanning process, on the X-axis, the stepping motor drives a synchronous wheel-belt transmission, so that the magnetic driving wheel is rotated to achieve the purpose of stepping. On the Y-axis, the stepping motor on the module body drives the probe to reciprocate. Each time when the probe moves on the Y-axis, the X-axis is intersected to step once, thereby generating a grid scan image.

The scanning device has a multi-gate function. The position accuracy of the X-axis and the Y-axis can reach ±1.5 mm. The scanning resolution can be adjusted to achieve three-dimensional C-scan imaging. The scanning resolution is up to 0.5 mm*0.5 mm, which means that the actual measurable diameter is slightly larger than 0.5 mm. When scanning with the scanning resolution of 3 mm×3 mm, the standard testing speed is 0.7 $m^2$/h, taking into account the actual measurement conditions, including time spent for manual operations such as changing the position of the equipment and adjusting a parameter. The device is equipped with a 24V water pump and a 5 m long coaxial cable for data transmission, command control and coupling control. A traction device uses a high-torque stepping motor and a magnetic driving wheel, which has a combined driving force of 35 kg, and has a sufficiently large magnetic force to complete rotation adsorption. The scanning device is driven by a stepping motor equipped with a 40:1 reducer. The stepping motor increases the driving force, so that four sets of adsorption wheels can ensure that the device is stably adsorbed on an outer wall of a pipeline. The magnetic driving wheel is covered with a non-slip rubber on the surface, which provides adhesion and ensures smooth operation. The ultrasonic probe used is an OLYMPUS high-frequency ultrasonic flat probe, with a frequency of 5 MHz. The probe has a diameter of 16 mm and a height of 72.40 mm. The probe holding device is fixed on a linear module. The probe holding device synchronously moves with the synchronous belt in the module, and is a mechanism that connects the module and the probe. The universal joint type probe holding device plus a stainless steel protective cover can ensure that the probe is always vertical to a tested surface. The protective cover can reduce the wear of the probe by the rough tested surface. The probe holding device has three moving parts. The probe can automatically adjust the orientation thereof through the combined action of a coupling device and a spring mechanism. Thus, the probe always contacts the outer wall of the pipe in a normal direction and maintains an acoustic beam vertical to a normal plane of the pipe. A 25 mm thick adjustment range of a water film layer is retained, and a water cavity is formed when water is injected. This ensures that the probe and the workpiece are completely filled with water to ensure the accuracy of the scan. Even when an uneven surface is encountered, the probe can be kept away from the workpiece, so as to protect the probe from damage. A holding adjustment device can adaptively adjust the angle of the probe and the module, so as to adapt to pipes with a pipe diameter in the range of 73 mm to 300 mm. When the probe is placed on the holding device for testing, an A-scan image is obtained. When a gate is adjusted to reach a waveform position corresponding to the surface to be tested, scanning is started to generate a corresponding C-scan image of this pipe segment. Data acquisition and analysis report software included in a computer can automatically store A and C-scan images and thickness measurement values and can allow view of these data in real time. The magnetic driving device is composed of a stepping motor and a magnetic driving wheel. Each traction device has a set of stepping motor. The surface of the magnetic driving wheels is coated with non-slip rubber. After the magnetic driving device is used, the scanning device can complete the scanning of the workpiece in the vertical, horizontal, and inverted directions. A neodymium-iron-boron magnet with super-strong magnetism is used. The material has many significant characteristics. Its molecules are active, and are easy to undergo an oxidative corrosion reaction with oxygen in the air. Besides, the material is brittle. Therefore, it is necessary to perform a multilayer treatment on the surface of the material. First, the surface is passivated by galvanizing to prevent the decrease of magnetism. At the same time, the surface is coated with non-slip rubber to increase the friction and the load. The rubber has a cushioning effect to prevent the magnet from breaking. The use of polyurethane rubber with a Shore hardness of 65 A can not only ensure that the magnet will not be broken, but also ensure that the body of the device is well supported while the pressure of the adsorption wheel is borne. When in use, four sets of driving wheels are used to ensure sufficient adsorption capacity, so that the device can be adsorbed on the outer wall of the pipe. The magnet is axially magnetized, and the direction of a magnetic induction line is along an axis direction. This magnetization method can ensure that the magnetism of any point on an outer circle of the magnetic driving wheel is the same. When the adsorption wheel contacts a metal pipe, there will not be instable rotation of the adsorption wheel caused by different magnetism between two points. The magnetic driving wheel has an overall diameter of 41 mm and a thickness of 45 mm. The combination of a magnet and an iron block is used to increase the adsorption force of the adsorption wheel while ensuring the support of the entire device body.

The control module is composed of a linear module, a servo motor and an industrial computer. The linear module has a scan length of 300 mm. The servo motor provides power for reciprocating scanning, and feedbacks the position information of the scan. The industrial computer provides overall control for the equipment. Water is used as a couplant, which is transported by a water pump. When water is splashed, a shell can ensure the relative stability of the motor's operating environment. The transmission method is a synchronous wheel-synchronous belt transmission method with a transmission ratio of 1:1, and with no slip during work. This transmission has convenient maintenance, low transportation cost, good environmental adaptability, and can work normally under a severe condition. The integrated design of the motor plus the reducer can reduce the overall size on the premise of ensuring normal use. At the same time, the integrated design can also ensure the connection accuracy and the stability of mechanism operation. The industrial computer uses a 10-core aviation plug wire to connect the equipment and a control bus of the water pump. In addition, an ultrasonic shielded wire integrates all motion control and imaging into the industrial computer to achieve automatic test of the pipe.

A non-contact water spray coupling method is used for coupling. Compared with other types of couplants, the use of water as an ultrasonic conductive couplant has natural advantages. Water has low cost, and can be used in large quantities anytime and anywhere. The role of water is to improve the transmission of sound energy between the probe and the test piece. At the same time, water has a lubricating effect of reducing the friction between the probe and the test piece, thereby preventing the tested surface from wearing the probe, and making the probe easy to move. A water pump and a direct current power supply etc. are used as assistant devices. The water pump provides a coupling environment for coupling the probe with water. The direct current power supply provides the device with power, which reduces the limitation of the working environment on the power supply. Water is used as a couplant. The water pump is installed for water supply, and a water supply pipeline supplies water to the position of the probe to ensure intact contact of the probe with the surface of the workpiece. An LX-1211 miniature direct current brushless water pump is used. A chain is installed at both ends of the shell to fix a conductor, a water tube, and the ultrasonic shielded wire. After all the wires are fixed through the chain, they are connected to the industrial computer in a unified manner. The wires are heavy, and if the wires are separately connected to the industrial computer and a crawling mechanism, the wires will be broken at a connection. Therefore, it is necessary to arrange the chain to fix the wires.

1. When in use, the scanning device is lifted by using a handle, and attached to the workpiece to be tested. The computer and a switch of the scanning device are first turned on, and then test software is opened.

2. Scanning parameters such as a scanning range, a delay, and a gain are adjusted, so that an A-scan waveform is properly displayed on an interface. A testing method of amplitude/distance imaging and a sound speed of the material are selected, and the position of a gate is adjusted to select a waveform. A scanning parameter in the X and Y directions is adjusted, a water supply switch is turned on, and the scanning is started after a bubble is discharged.

3. A scanning control function is provided. In order to facilitate observation of the A-scan waveform at somewhere, the position and width of the gate can be adjusted. The scanning can be paused at any time during the scanning process. After scanning somewhere, the scanning can be stopped, and the position is changed to continue scanning.

4. The scanning speed and range are set through motor control, where the X axis is a direction on which the magnetic wheel steps, and the Y axis is a direction on which a scan axis steps.

5. The position of the probe is manually controlled by a manual control function, which is convenient for pinpointing the position of a defect and setting a starting position. A stop function can stop a motion or scanning process immediately.

6. The A-scan waveform can be displayed within the range during scanning. The height of the A-scan waveform is enlarged by adjusting the gain value. The A-scan waveform in a target area is displayed in an A-scan interface by a delay function. The sound speed of the material can be selected based on the tested workpiece. An ultrasonic transmission frequency can be repeated by Pulse Repetition Frequency (PRF).

7. The device defaults to amplitude imaging, which is generated by the height of a reflected amplitude received. If necessary, amplitude imaging can be manually directly switched to distance imaging, that is, an image is generated according to the change of the thickness of the workpiece. In this mode, a distance threshold can be set. If a distance is lower or higher than the value, a defect will be displayed.

8. A defect area is displayed, and the percentage of a total defect area is calculated to determine whether the workpiece is qualified according to the threshold.

9. After the scan is completed, the water supply switch, the scanning device switch and the computer are turned off in order.

10. Whether to save data or an image is chosen. The data saved at the beginning of the test can be played back through an image loading function, and the playback process can be paused and ended at any time.

What is claimed is:

1. A visual ultrasonic nondestructive testing device for a deep/long-hole pipe, the device comprising an ultrasonic measurement module, a mechanical motion module, a control module, and a coupling injection and assistance module, wherein:

the ultrasonic measurement module comprises an ultrasonic pulse transmitter/receiver, and the ultrasonic transmitter/receiver comprises a high-speed analog/digital (A/D) converter; the mechanical motion module comprises a scanning device, a probe and a holding device thereof, and a magnetic drive device;

the connection between the various parts of the device is characterized in that: the scanning device is fixedly connected to the magnetic drive device, and the probe and the holding device thereof are connected to the scanning device; the probe holding device ensures that the probe contacts an outer wall of a pipe in a normal direction to maintain an ultrasonic beam vertical to a normal plane of the pipe;

a non-contact water spray coupling method is used for coupling; a water pump and a direct current power supply are used as assistant devices; the water pump provides a coupling environment for coupling the probe with water; the direct current power supply provides the device with power; water is used as a couplant; the water pump is connected to the scanning device via a water supply pipeline to supply water to the position of the probe to ensure intact contact of the probe with the surface of a workpiece;

the scanning device comprises a scanning module body and a module body stepping motor; the module body stepping motor is fixed to the module body by a bolt, and is connected to a synchronous wheel axle inside the module body via a coupling;

the magnetic drive device comprises a stepping motor and a magnetic driving wheel; and the magnetic drive device stepping motor drives a synchronous wheel-belt transmission, so that the magnetic driving wheel is rotated; the module body stepping motor drives the probe to reciprocate.

2. A method using the visual ultrasonic nondestructive testing device for a deep/long-hole pipe according to claim 1, wherein:

the scanning device can move in two directions, that is, an X-axis on which a magnetic driving wheel steps and a Y-axis on which the module body tests; during the scanning process, on the X-axis, a stepping motor drives a synchronous wheel-belt transmission, so that the magnetic driving wheel is rotated to achieve the purpose of stepping; on the Y-axis, the stepping motor on the module body drives the probe to reciprocate; each time when the probe moves on the Y-axis, the X-axis is intersected to step once, thereby generating a grid scan image.

3. A method using the visual ultrasonic nondestructive testing device for a deep/long-hole pipe according to claim 1, comprising:

1) lifting the scanning device, and attaching the scanning device to a workpiece to be tested; first opening a computer in the control module, and turning on a switch of the scanning device;

2) adjusting scanning parameters such as a scanning range, a delay, and a gain to display an A-scan waveform on an interface; adjusting a scanning parameter in the X and Y directions, turning on a water supply switch, and starting scanning after a bubble is discharged;

3) after scanning somewhere, stopping scanning, and changing the position to continue scanning, wherein the scanning can be paused at any time during the scanning process;

4) setting the scanning speed and range through motor control, wherein the X axis is a direction on which a magnetic wheel steps, and the Y axis is a direction on which a scan axis steps;

5) controlling the position of the probe to pinpoint the position of a defect and set a starting position, wherein a stop function may stop a motion or scanning process immediately;

6) displaying the A-scan waveform within the range during scanning, wherein the height of the A-scan waveform is enlarged by adjusting the gain value; the A-scan waveform in a target area is displayed in an A-scan interface by a delay function;

7) amplitude imaging, generated by the height of a reflected amplitude received; or distance imaging;

8) displaying a defect area, and calculating the percentage of a total defect area to determine whether the workpiece is qualified;

9) turning off the water supply switch, the scanning device switch and the computer in order after the scan is completed; and 10) choosing whether to save data or an image, wherein the data saved at the beginning of the test can be played back through an image loading function, and the playback process can be paused and ended at any time.

* * * * *